(12) United States Patent
Taillard et al.

(10) Patent No.: US 12,344,199 B2
(45) Date of Patent: Jul. 1, 2025

(54) WINDSCREEN WIPER DEVICE OF THE FLAT BLADE TYPE

(71) Applicants: TRICO BELGIUM S.A., Aubange (BE); AUDI A.G., Ingolstadt (DE); A. RAYMOND ET CIE SCS, Grenoble (FR); DR. ING. H.C. F. PORSCHE A.G., Weissach (DE); VOLKSWAGEN A.G., Wolfsburg (DE)

(72) Inventors: Arthur Taillard, Herserange (FR); Stephan Häfner, Prebitz (DE); Sven Auch, Stuttgart (DE); Frank Ackermann, Königslutter am Elm (DE); Karl Bode, Lörrach (DE)

(73) Assignees: TRICO BELGIUM S.A., Aubange (BE); AUDI A.G., Ingolstadt (DE); A. RAYMOND ET CIE SCS, Grenoble (FR); DR. ING. H.C.F. PORCHE A.G., Weissach (DE); VOLKSWAGEN A.G., Wolfsburg (DE)

( * ) Notice: Subject to any disclaimer, the term of this patent is extended or adjusted under 35 U.S.C. 154(b) by 104 days.

(21) Appl. No.: 17/905,410

(22) PCT Filed: Mar. 30, 2020

(86) PCT No.: PCT/EP2020/058989
§ 371 (c)(1),
(2) Date: Aug. 31, 2022

(87) PCT Pub. No.: WO2021/197570
PCT Pub. Date: Oct. 7, 2021

(65) Prior Publication Data
US 2023/0119941 A1    Apr. 20, 2023

(51) Int. Cl.
*B60S 1/40*    (2006.01)
*B60S 1/04*    (2006.01)
(Continued)

(52) U.S. Cl.
CPC ............ *B60S 1/4087* (2013.01); *B60S 1/3415* (2013.01); *B60S 1/3479* (2013.01); *B60S 1/3863* (2013.01);
(Continued)

(58) Field of Classification Search
CPC ...... B60S 1/3415; B60S 1/522; B60S 1/4083; B60S 1/4087; B60S 1/3863; B60S 1/3479;
(Continued)

(56) References Cited

U.S. PATENT DOCUMENTS 3,940,068 A * 2/1976 Mohnach ................ B05B 15/60
15/250.04

FOREIGN PATENT DOCUMENTS

DE      2942086 A1    4/1981
DE   102014225477   *  6/2016
(Continued)

OTHER PUBLICATIONS

Machine translation of description portion of German publication 102014225477, published Jun. 2016. (Year: 2016).*
(Continued)

*Primary Examiner* — Gary K. Graham
(74) *Attorney, Agent, or Firm* — DAY PITNEY LLP; George N. Chaclas

(57) ABSTRACT

A windscreen wiper device of the flat blade type comprising an elastic, elongated carrier element, as well as an elongated wiper blade of a flexible material, which can be placed in abutment with a windscreen to be wiped, which wiper blade includes at least one longitudinal slit, in which slit at least one longitudinal strip of the carrier element is disposed, which windscreen wiper device comprises a connecting device for a rod-like extension of an oscillating arm, wherein said rod-like extension can be pivotally connected to said
(Continued)

connecting device about a pivot axis near a free end thereof, wherein said connecting device comprises a first part and a second part, wherein said rod-like extension of said oscillating arm can be pivotally connected to said first part about said pivot axis, with the interposition of said second part, wherein said first part is connected to said wiper blade and said second part is pivotally (preferably also detachably) connected onto said first part, wherein said second part comprises a channel arranged to receive said free end of said rod-like extension, with the special feature that said windscreen wiper device comprises a housing for said rod-like extension, wherein said housing is arranged to be connected to said second part, and wherein said housing comprises a channel to receive said rod-like extension, said channel of said housing in mounted position being co-axial with said channel of said second part.

18 Claims, 7 Drawing Sheets

(51) Int. Cl.
  *B60S 1/34* (2006.01)
  *B60S 1/38* (2006.01)
  *B60S 1/52* (2006.01)

(52) U.S. Cl.
  CPC .............. *B60S 1/522* (2013.01); *B60S 1/0408* (2013.01); *B60S 2001/4051* (2013.01); *B60S 2001/4054* (2013.01)

(58) Field of Classification Search
  CPC ............ B60S 2001/4054; B60S 1/0408; B60S 2001/4051
  USPC ......................... 15/250.32, 250.04, 250.351
  See application file for complete search history.

(56) References Cited

FOREIGN PATENT DOCUMENTS

| | | |
|---|---|---|
| DE | 102015224631 A1 | 6/2017 |
| DE | 102015224634 A1 | 6/2017 |
| WO | 2019105647 A1 | 6/2019 |
| WO | 2019161990 A1 | 8/2019 |
| WO | 2020043264 A1 | 3/2020 |
| WO | 2020212322 A1 | 10/2020 |
| WO | 2020212342 A1 | 10/2020 |

OTHER PUBLICATIONS

International Preliminary Report on Patentability for PCT/EP2020/058989 dated Oct. 13, 2022.
International Search Report PCT/EP2020/058989, dated Nov. 26, 2020.

* cited by examiner

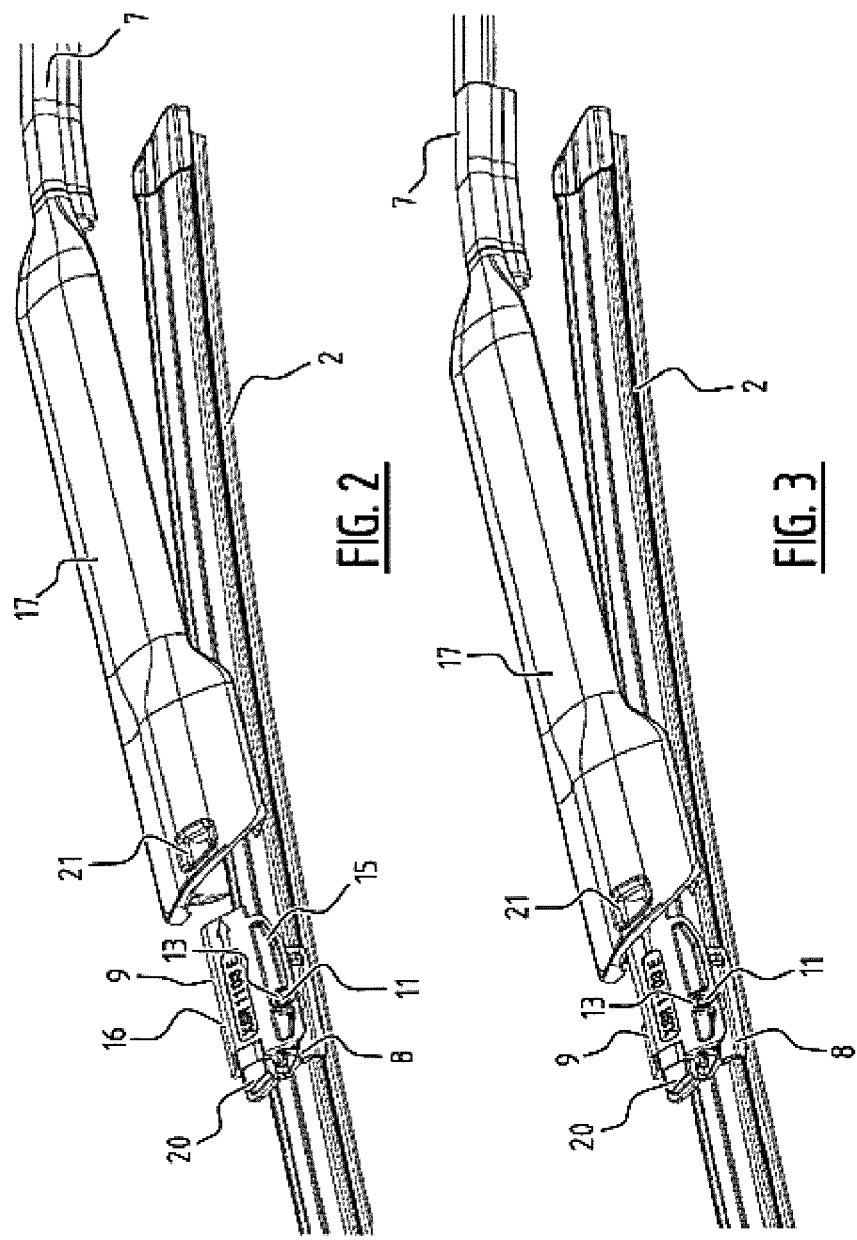

WINDSCREEN WIPER DEVICE OF THE FLAT BLADE TYPE

CROSS-REFERENCE TO RELATED APPLICATIONS

This application is a U.S. national stage entry of International Application No. PCT/EP2020/058989 filed on Mar. 30, 2020. International Application No. PCT/EP2020/058989 is incorporated herein by reference in its entirety.

BACKGROUND

A windscreen wiper device is generally known. This prior art windscreen wiper device is designed as a so-called "flat blade" or "yokeless blade", wherein no use is made of several yokes pivotally connected to each other, but wherein the wiper blade is biased by the carrier element, as a result of which it exhibits a specific curvature. A disadvantage of the known windscreen wiper device is that it is often used in combination with a nozzle fixedly mounted on (or below) a bonnet of a car for spraying a washing liquid onto the car's windscreen to be wiped. In practice it has become apparent that the windscreen cannot effectively be cleaned by a combination of the oscillating arm and the nozzle, as the nozzle emits the washing fluid thereon at a large distance relative to the windscreen, so that a relatively large amount of the washing fluid does not effectively reach a wiping pattern on the windscreen to be wiped. Further, it has become apparent that in the prior art a large amount of liquid (consumption) is required in an attempt to clean the windscreen to be wiped. Further, if the washing fluid is spread onto the car's body instead of onto the windscreen to be wiped, it may damage the car. Indeed, ethanol, methanol and other components of the washing fluid are believed to have a corrosive effect on paint, rubber, car wax and plastics, for example. In order to overcome this disadvantage, it has been proposed to mount the nozzle onto the oscillating arm, so that the use (and replacement) of a simple and inexpensive wiper blade is also assured. However, mounting the nozzle onto the oscillating arm has the disadvantage that aerodynamic properties of the interconnection between the wiper blade and the rod-like extension are negatively influenced.

SUMMARY

The present invention relates to a windscreen wiper device of the flat blade type comprising an elastic, elongated carrier element, as well as an elongated wiper blade of a flexible material, which can be placed in abutment with a windscreen to be wiped, which wiper blade includes at least one longitudinal slit, in which slit at least one longitudinal strip of the carrier element is disposed, which windscreen wiper device comprises a connecting device for a rod-like extension of an oscillating arm, wherein the rod-like extension can be pivotally connected to said connecting device about a pivot axis near one end thereof, wherein said connecting device comprises a first part and a second part, wherein said rod-like extension of said oscillating arm can be pivotally connected to said first part about said pivot axis, with the interposition of said second part, wherein said first part is connected to said wiper blade and said second part is pivotally connected to said first part, wherein said second part comprises a channel arranged to receive said free end of said rod-like extension. Said longitudinal strip is also called a "flexor", while said connecting device is also indicated as a "connector". The slit may be open or closed. Preferably, said second part is also detachably connected to said first part.

Preferably, said wiper blade comprises a spoiler at a side thereof facing away from the windscreen to be wiped. The spoiler is also called an "air deflector" and is preferably made in one piece with said wiper blade through extrusion. Said longitudinal slit is preferably a central longitudinal slit accommodating said longitudinal strip. Said connecting device is preferably fixedly connected to the longitudinal strip(s) particularly through a welding, brazing ("soldering"), gluing or clamping operation or with the help of a pin inserted through said connecting device and said longitudinal strip(s). In the alternative or in addition thereto, said connecting device is clamped onto the flexible material of the wiper blade, particularly in case the latter is equipped with a central longitudinal slit for the carrier element. In the alternative or in addition thereto, said connecting device comprises a groove for accommodating said wiper blade and/or said longitudinal strip(s), wherein said groove comprises retention means for retaining said connecting device in place.

In use, said oscillating arm is connected to a mounting head mounted on a drive shaft, wherein said oscillating arm at one end thereof is pivotally connected to the mounting head by means of a pivot pin and at another end thereof is connected to said wiper blade placed in abutment with said windscreen to be wiped. In use, the shaft rotates alternately in a clockwise and in a counter-clockwise sense carrying the mounting head into rotation also, which in turn draws the oscillating arm into rotation and by means of said connecting device moves the wiper blade. Said oscillating arm can thus oscillate to-and-from between first and second reversal positions.

The present invention also relates to a connecting device arranged for use in such a windscreen wiper device.

It is noted that the present invention is not restricted to automobiles, but also refers to rail coaches and other (fast) vehicles.

It is an object of the invention to provide an improved windscreen wiper device, wherein these disadvantages are obviated, in the sense that at minimum costs—without using complex machinery and additional tools—an aerodynamic, but reliable and controllable interconnection between the wiper blade and the rod-like extension is realized, also in the event that a nozzle is mounted on the oscillating arm. More in particular, an object of the present invention is to propose an improved windscreen wiper device, wherein the oscillating arm and the nozzle are well integrated in the design of the arm, and wherein the aerodynamic performances of the arm are improved.

In order to accomplish that objective, a windscreen wiper device of the type referred to in the introduction is characterized according to the invention in that said windscreen wiper device comprises a housing for said rod-like extension, wherein said housing is arranged to be connected to said second part, and wherein said housing comprises a channel to receive said rod-like extension, said channel of said housing in mounted position being co-axial with said channel of said second part. Hence, as the second part is reinforced over its entire length by the rod-like extension, a rigid and low (i.e. aerodynamic) interconnection between the wiper blade and the rod-like extension is made possible. Said channels of said second part and of said housing preferably have a closed circumference.

Preferably, said channel of said second part and said channel of said housing each have a length and a width, and wherein a plane extending in a direction of the width of each channel and a plane extending through said longitudinal strip along a width thereof at the location of the connecting device enclose an angle α, wherein preferably 15°<α<60°. In other words, in a transverse or cross-section of the windscreen wiper device, a centre line of the cross-sectional plane of each channel encloses the angle α with a symmetry axis of said longitudinal groove. Because of the angle α less pressure by the oscillating arm on the wiper blade is necessary to maintain high velocity wiping performances.

In the framework of the present invention said oscillating arm is equipped with said rod-like extension preferably having a substantially rectangular cross-section, wherein said extension is to be inserted in the channels of the connecting device and of the housing, and wherein said extension has a twisted orientation relative to the oscillating arm preferably having a U-shaped cross-section. Such a twisted arm extension has proven to considerably improve an air flow, to considerably reduce a height of the windscreen wiper device, whereas its design is attractive from a commercial perspective. Said channels preferably having a rectangular cross-section as well, have a possible twisted orientation corresponding to the twisted orientation of the arm extension in order to accommodate said arm extension during use. In other words, a bottom of each channel does not extend parallel to a windscreen to be wiped (when the oscillating arm in one of said reversal positions is in a central region of the windscreen to be wiped and disregarding any small curvature thereof in that region), but said bottom and said windscreen to be wiped enclose said angle α in that region.

It is noted that the present invention is not restricted to the use of only one longitudinal strip forming the elastic carrier element that is particularly located in a central longitudinal slit or groove of the wiper blade. Instead, said carrier element may also comprise two longitudinal strips, wherein said strips are disposed in opposite longitudinal slits/grooves of the wiper blade. Said slit(s)/groove(s) may be closed at one outer end.

In a preferred embodiment of a windscreen wiper device in accordance with the invention said housing and said second part are arranged to be interconnected by sliding said housing onto said second part in longitudinal direction of said rod-like extension. Particularly, said channel of said second part is arranged to receive said free end of said rod-like extension upon sliding said housing onto said second part. More in particular, said second part is located inside said housing, i.e. is surrounded by said housing, after sliding said housing onto said second part. This means that said second part is invisible from the outside. Hence, the second part is reinforced over its entire length by the rod-like extension and the housing, so that a very rigid interconnection is obtained. This would result in less stress and thus in less wear and play.

In another preferred embodiment of a windscreen wiper device according to the invention said second part and said housing are provided with mutually cooperating guiding means arranged to guide said housing onto said second part upon sliding said housing onto said second part. Particularly, said guiding means comprise a longitudinally extending guiding rib on an outer surface of said second part arranged to slide inside a guiding groove on an inner surface of said housing. In the alternative or in addition thereto, said guiding means comprise a laterally inwardly bend edge of a top wall of said housing arranged to slide behind a laterally outwardly extending edge of a side wall of said second part.

In another preferred embodiment of a windscreen wiper device in accordance with the invention said second part comprises a resilient tongue arranged to engage into a hole of said housing, and wherein said resilient tongue is hingeable along a hinge axis between an inward position retaining said wiper blade onto said rod-like extension and an outward position releasing said wiper blade from said rod-like extension. Said resilient tongue is preferably located near a free end of said second part facing away from said rod-like extension. Thus, when sliding the housing over the second part, the resilient tongue is not deformed until this sliding movement is (nearly) finished, so that fitting the wiper blade onto the rod-like extension is also not disturbed until then. Preferably, said housing has an U-shaped cross-section at the location of its connection to said second part, and wherein a base of said U-shaped cross-section is provided with said hole.

In another preferred embodiment of a windscreen wiper device according to the invention said hole has a closed circumference.

In another preferred embodiment of a windscreen wiper device in accordance with the invention said first part and said second part are provided with mutually cooperating pivot means for pivotally connecting said second part to said first part. Particularly, said second part is connected to said first part by pivotally engaging protuberances of said first part, at the location of said pivot axis, in recesses provided in said second part. Said protuberances are particularly mutually spaced far apart, so as to reduce angular play and to reduce wear.

In another preferred embodiment of a windscreen wiper device according to the invention said windscreen wiper device comprises first and second retention means for retaining said wiper blade onto said rod-like extension/housing, wherein said first retention means comprises said resilient tongue on said second part and said hole in said housing, wherein said second retention means comprises at least one first stop surface provided on said first part and at least one second stop surface provided on said housing, both stop surfaces being spaced apart during normal operation of said windscreen wiper device, and wherein in case of malfunctioning of said first retention means, said first part is allowed to move with respect to said housing causing the first stop surface to correspondingly move towards the second sop surface until the first and second stop surfaces are adjacent one another to block in mounted position any movement of said wiper blade relative to said housing in a longitudinal direction away from said rod-like extension. In case these first retaining means would fail in actual practice, for example when the resilient tongue is not properly snapped into the hole, the second retaining means would serve to hold the wiper blade onto the housing after all and thus to avoid any undesired separation thereof, with all negative consequences involved, such as lost of the wiper blade. In the event that the first retaining means would break down, the wiper blade and the connecting device attached thereto may move relative to the rod-like extension. As explained, such a movement takes place in longitudinal direction of the wiper blade, causing the first stop surface (provided on the first part of the connecting device) to move towards the second stop surface (provided on the housing for the rod-like extension) in a similar way. However, said relative movement of the wiper blade and the rod-like extension and thus the relative movement of both stop surfaces are blocked when the first stop surface reaches the second stop surface and is stopped by the second stop surface. Said first part preferably comprises a laterally outwardly extending protrusion comprising said first stop surface, wherein said housing comprises a downwardly extending protrusion comprising said second stop surface, and wherein in mounted position said protrusions abut each other to block said movement.

In another preferred embodiment of a windscreen wiper device in accordance with the invention, by pivoting said first part relative to said housing, said first and second stop surfaces are prevented from abutting one another, so that the wiper blade can be released from said rod-like extension. In other words, in such a pivoted position the stop surfaces are no longer in line and cannot cooperate any longer.

In another preferred embodiment of a windscreen wiper device in accordance with the invention said first and said second parts are each made in one piece of plastic material.

In another preferred embodiment of a windscreen wiper device according to the invention a nozzle is mounted onto said housing, wherein said nozzle is arranged to spray a cleaning liquid onto the windscreen to be wiped.

The present invention also relates to a housing for a rod-like extension of an oscillating arm arranged for use in such a windscreen wiper device.

BRIEF DESCRIPTION OF THE DRAWINGS

The invention will now be explained in more detail with reference to figures illustrated in a drawing, wherein:

FIG. 2 illustrates in a first step how a wiper blade of the windscreen wiper device of FIG. 1 is mounted to an oscillating arm thereof;

FIG. 3 illustrates in a second step how a wiper blade of the windscreen wiper device of FIG. 1 is mounted to an oscillating arm thereof;

DETAILED DESCRIPTION

Figure 1:
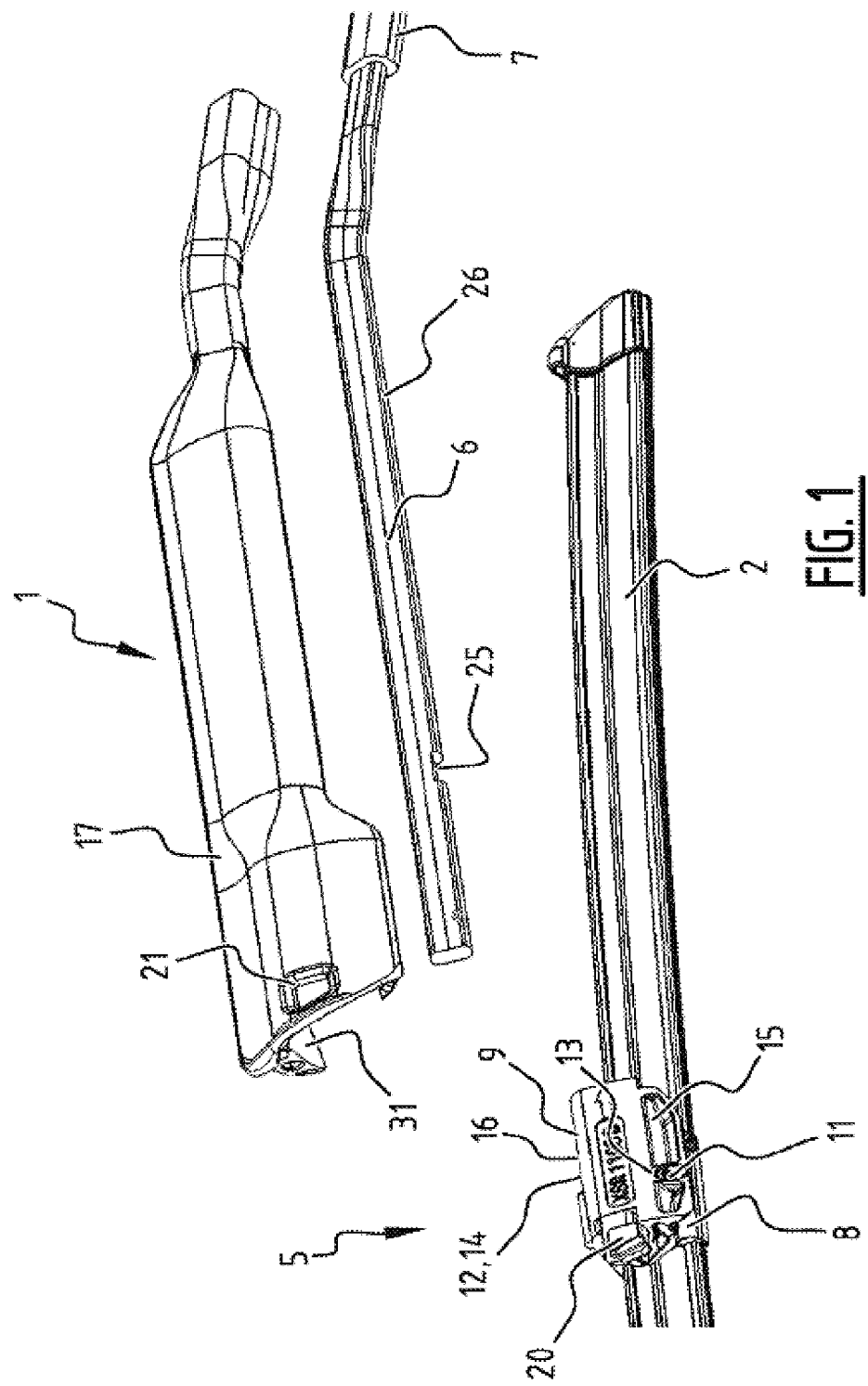
FIG. 1 is a perspective view of a windscreen wiper device according to the invention, in (partly) disassembled position.
Figure 4A:
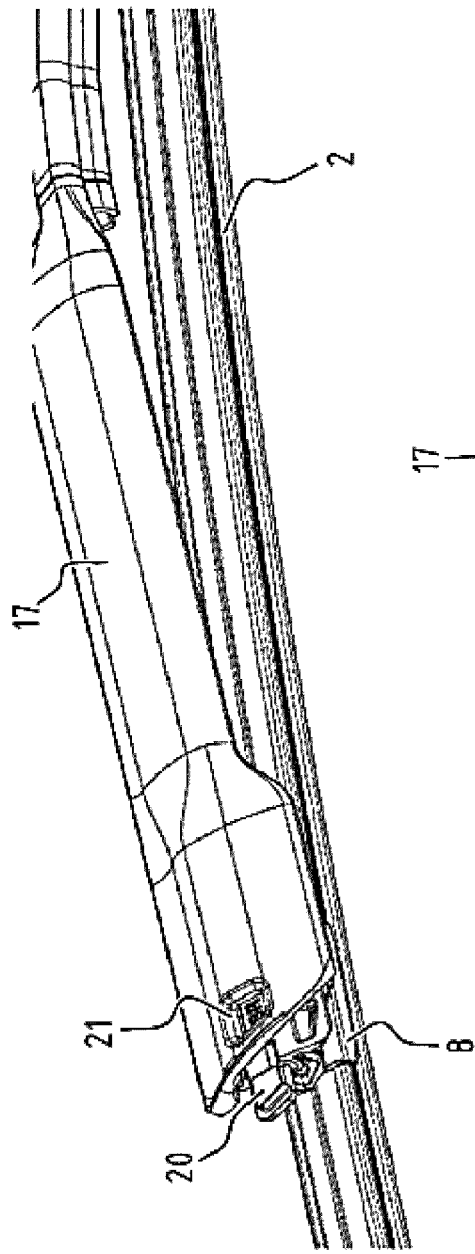
FIG. 4A illustrates in a third step how a wiper blade of the windscreen wiper device of FIG. 1 is mounted to an oscillating arm thereof.
Figure 4B:
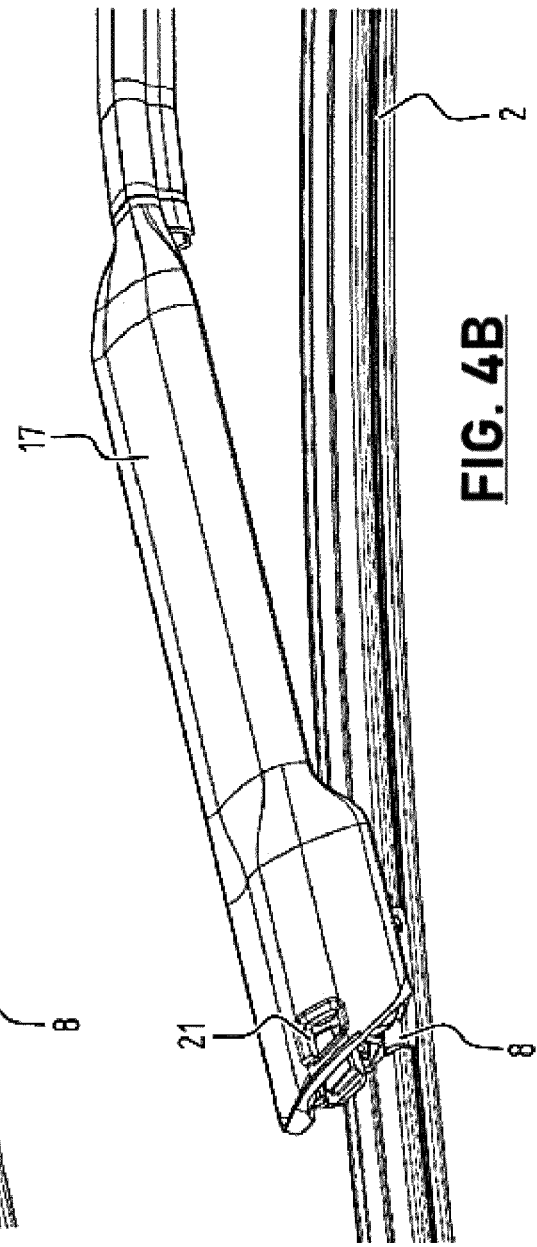
FIG. 4B illustrates in a fourth step how a wiper blade of the windscreen wiper device of FIG. 1 is mounted to an oscillating arm thereof.
Figure 5:
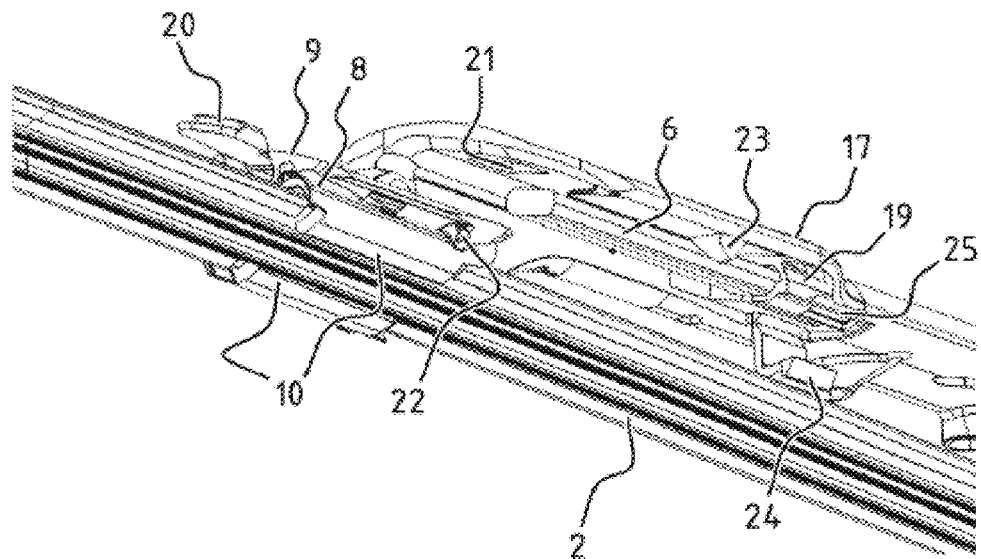
FIG. 5 illustrates a cut away view of FIG. 3.
Figure 6:
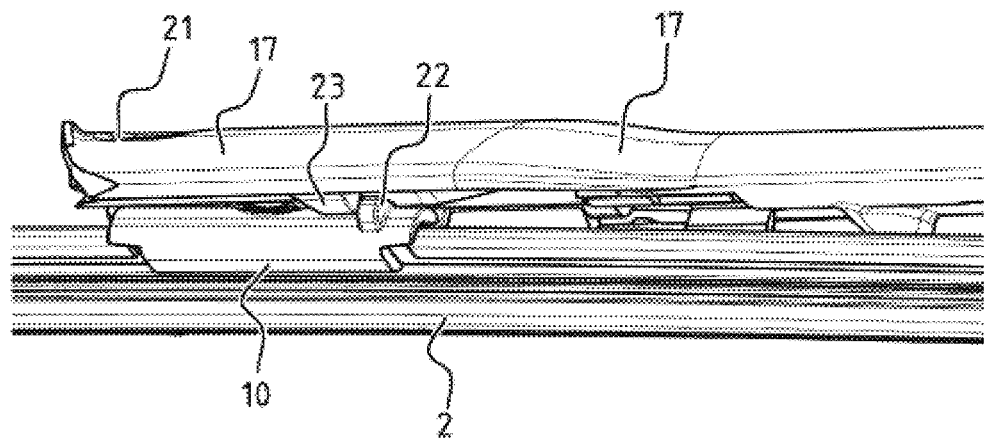
FIG. 6 illustrates in a first step how a wiper blade of the windscreen wiper device of FIG. 1 is dismounted from an oscillating arm thereof.
Figure 10:
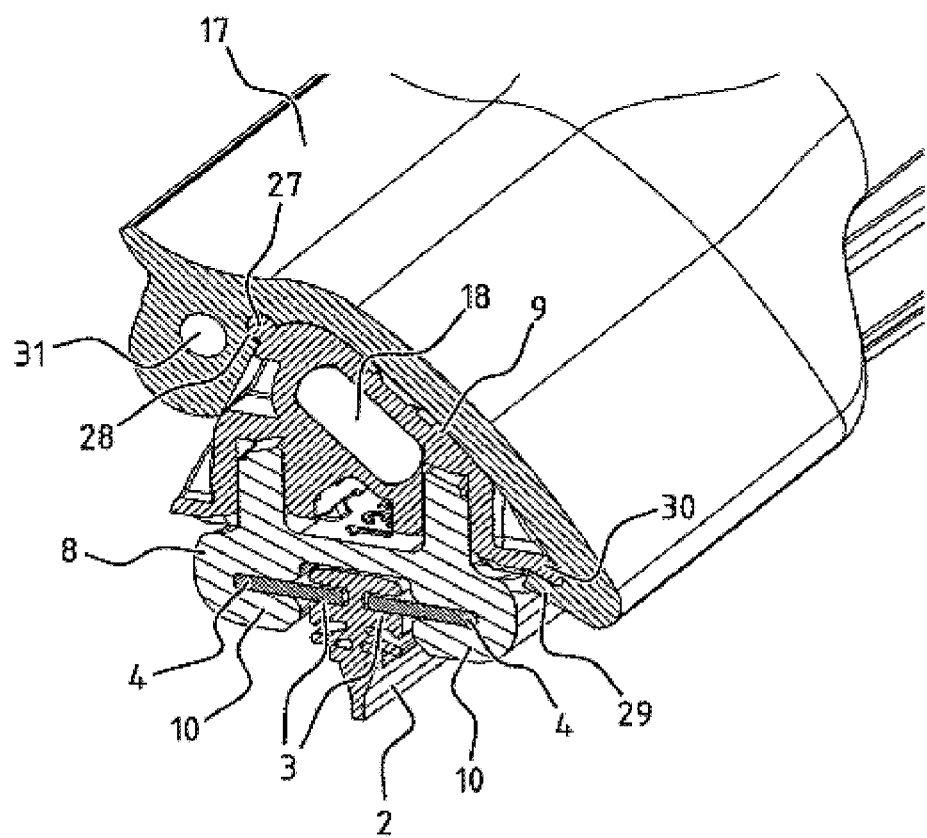
FIG. 10 is a cross-sectional view of FIG. 9B.

FIGS. 1 and 10 refer to a windscreen wiper device 1 of the flat blade type in accordance with the invention, built up of a wiper blade 2, in the longitudinal sides of which opposing longitudinal slits 3 are formed, and of longitudinal strips 4 ("flexors") made of spring band steel, which are fitted in said longitudinal slits 3. Said strips 4 form a flexible carrier element for the rubber wiper blade 2, as it were, which is thus biased in a curved position (the curvature in operative position being that of a windscreen to be wiped). As shown in FIGS. 1 through 8, the windscreen wiper device 1 is furthermore built up of a connecting device 5 of plastic material for a rod-like extension 6 of a windscreen wiper arm 7. Said connecting device 5 comprises a first part 8 and a second part 9 acting as a joint part, wherein said rod-like extension 6 can be pivotally connected to said first part 8 about said pivot axis, with the interposition of said second part 9. With reference to FIGS. 5 through 8, said first part 8 comprises inwardly extending legs 10 integral therewith engaging around longitudinal sides of the wiper blade 2, at the location of said grooves 3, as a result of which the first part 8 is firmly attached to the unit consisting of the wiper blade 2 and the strips 4. Said first part 8 comprises two cylindrical protuberances 11,12 extending outwardly. These protuberances 11,12 pivotally engage, at the location of said pivot axis, in identically shaped recesses 13,14 provided in opposite walls 15,16 of the second part 9. Hence, said second part 9 is connected to said first part 8 through a snapping/clipping operation. As shown in FIGS. 1 through 8, said windscreen wiper device 1 further comprises a housing 17 arranged to accommodate said rod-like extension 6.

With reference to FIGS. 5, 9A, 9B, and 10 said second part 9 comprises a channel 18 arranged to receive (in a linear movement) said rod-like extension 6 of said oscillating arm 7, whereas said housing 17 also has a channel 19 for accommodating said rod-like extension 6. Both channels 18,19 are co-axial. As shown, said channels 18,19 each have a length and a width, and wherein a plane extending in a direction of the width of said channel and a plane extending through said longitudinal strip along a width thereof at the location of the connecting device enclose an angle α=40°.

As shown in FIGS. 2 through 5, said housing 17 and said second part 9 are arranged to be interconnected by sliding said housing 17 onto said second part 9 in longitudinal direction of said rod-like extension 6, wherein said channel 18 of said second part 9 is arranged to receive said free end of said rod-like extension 6 upon sliding said housing 17 onto said second part 2. In assembled position (FIG. 6) said second part 9 is invisible from the outside inside said housing 17 after sliding said housing 17 onto said second part 9. In this assembled position a resilient tongue 20 on the second part 9 engages into a hole 21 in the housing 17. More precisely, said housing has a U-shaped cross-section at the location of its connection to the second part 9 and a base of said U-shaped cross-section comprises said hole 21. The resilient tongue 20 and the hole 21 together act as first retention means in this case, i.e. to retain the unit consisting of the wiper blade 2 and the connecting device 5 onto the housing 17 and thus also onto the rod-like extension 6. Said resilient tongue 20 is hingeable (i.e. can pivot) along a hinge axis between an inward position retaining said second part 9 (together with the first part 8 and the wiper blade 2 attached thereon) onto said rod-like extension 6, and an outward position releasing second part 9 (together with the first part 8 and the wiper blade 2 attached thereon) from said rod-like extension 6. Said resilient tongue is hingeable (i.e. activated and deactivated) from said inward position into said outward position by a hand, as if it were a push button. This is a so-called bayonet connection.

Figure 7:
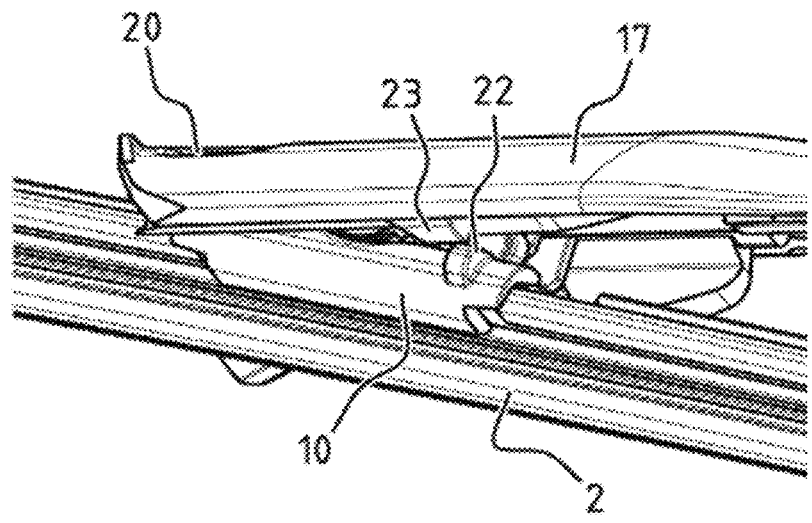
FIG. 7 illustrates in a second step how a wiper blade of the windscreen wiper device of FIG. 1 is dismounted from an oscillating arm thereof.
Figure 8:
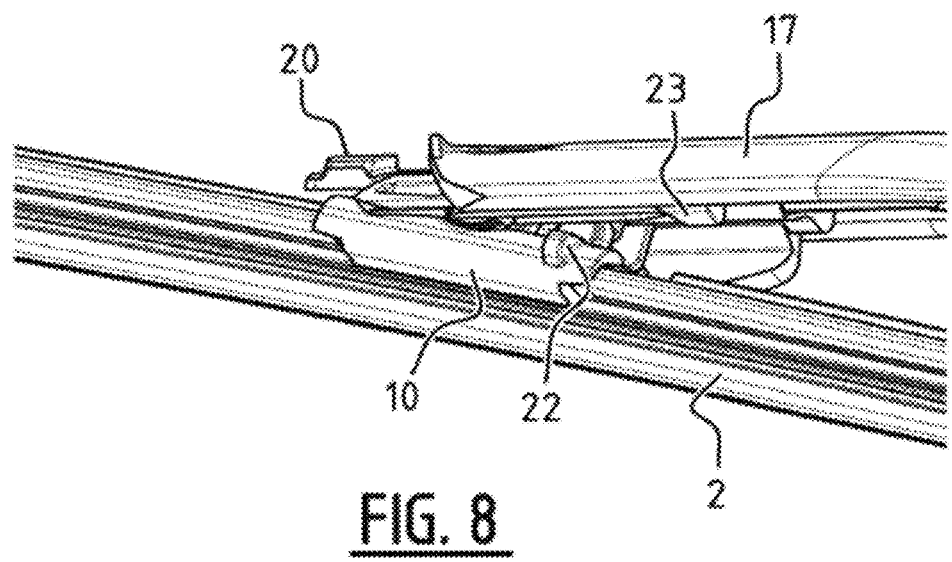
FIG. 8 illustrates in a third step how a wiper blade of the windscreen wiper device of FIG. 1 is dismounted from an oscillating arm thereof.

In case of any unforeseen failure of the bayonet connection acting as first retention means, second retention means are provided for. These second retention means comprise in this case mutually cooperating protrusions of said first part 8 and said housing 17 that are arranged to block in mounted position (FIG. 6) any movement of said wiper blade 2 relative to said housing 17 in a longitudinal direction away from said rod-like extension 6. More in particular, said first part 8 comprises a laterally outwardly extending protrusion 22, whereas said housing 17 comprises a downwardly extending protrusion 23. In case of malfunctioning of said first retention means, in mounted position said protrusion 22 on said first part 8 is able to move in longitudinal direction towards said protrusion 23 on said housing 17 until these protrusions 22,23 abut one another to block said movement in longitudinal direction away from said rod-like extension 6. Any movement of said wiper blade 2 relative to said housing 17 in a longitudinal direction towards said rod-like extension 6 is blocked by said channel 18 of said second part 9 and said channel 19 of said housing 17 abutting each other. As depicted in FIGS. 7 and 8, for dismounting the connecting device 5 from the rod-like extension 6, the second part 9 (and thus the free end of the rod-like extension 6 connected thereto), is pivoted relative to the first part 8. While carrying out the pivot movement, the protrusions 22,23 are not longer in line with each other, so that the second part 9 and the first part 8 attached thereto can be released from the housing 17/rod-like extension 6, of course after the resilient tongue 19 has been pushed in. As far as mounting is concerned, while carrying out the pivot movement, the protrusions 22,23 are in line with each other, so that the second part 9 and the first part 8 attached thereto is retained onto the rod-like extension 26 (working position). The mutually cooperating protrusions 22,23 act as second retention means in case first retention means, as explained above, would inadvertently fail. Said channel 19 of said housing 17 comprises a tab 24 pivotal between a closed position arranged to snappingly engage into a recess 25 provided on a longitudinal exterior side 26 of said rod-like extension 6, and an open position (FIG. 5) arranged to disengage from said recess 25.

Figure 9B:
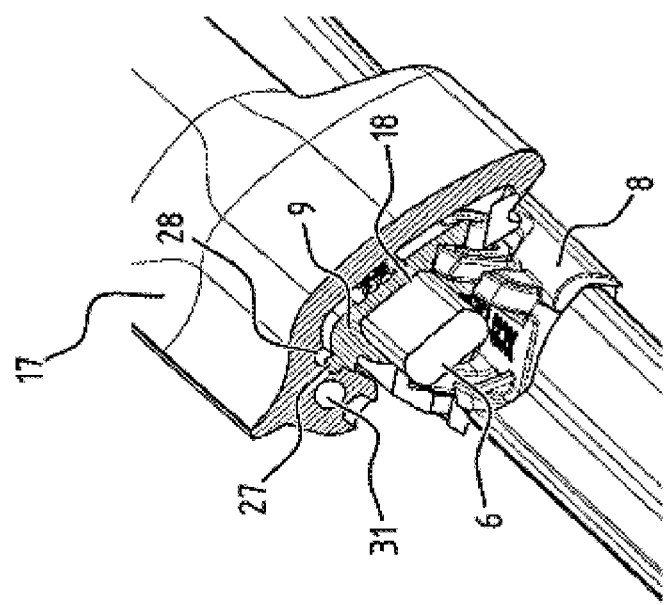
FIG. 9B is a perspective front view of the windscreen wiper device of FIG. 1 partly in a cross-sectional view.
Figure 9A:
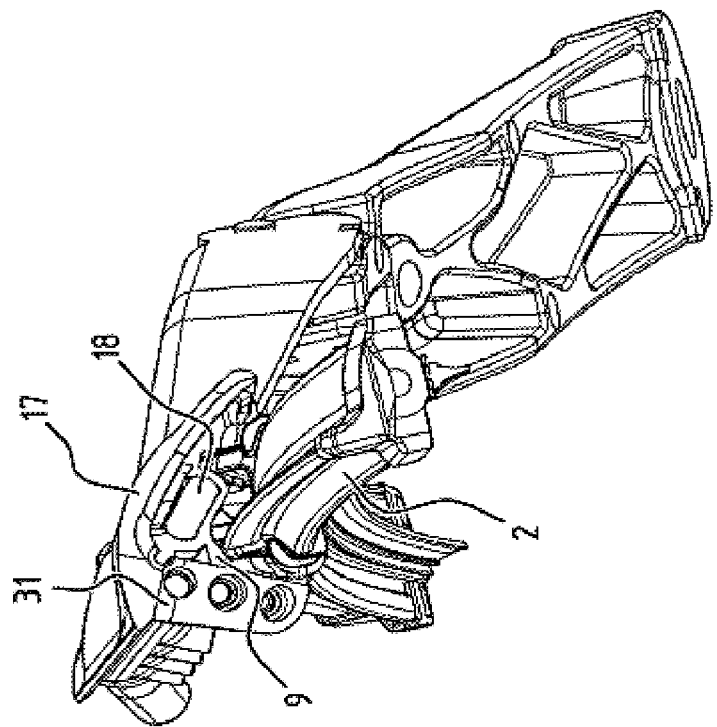
FIG. 9A is a perspective front view of the windscreen wiper device of FIG. 1 in assembled position.

As depicted in FIGS. 9A, 9B, and 10, said second part 9 and said housing 17 are provided with mutually cooperating guiding means arranged to guide said housing 17 onto said second part 9 upon sliding said housing 17 onto said second part 9. More in particular, said guiding means comprise a longitudinally extending guiding rib 27 on an outer surface of said second part 9 arranged to slide inside a guiding groove 28 on an inner surface of said housing 17. The guiding means also comprise a laterally inwardly bend edge 29 of a top wall of said housing 17 arranged to slide behind a laterally outwardly extending edge 30 of a side wall of said second part 9 (FIG. 10).

Optionally, the housing 17 is equipped with a nozzle 31 arranged to spray cleaning liquid onto a windscreen to be wiped. The nozzle 31 is preferably fixed to a leg of the U-shaped cross-section of said housing 17 that in use faces away from a downward reversal position of the oscillating arm 7. In the prior art a windscreen wiper device is often used in combination with a nozzle fixedly mounted on (or below) a bonnet of a car for spraying a washing liquid onto the car's windscreen to be wiped. In practice it has become apparent that the windscreen cannot effectively be cleaned by a combination of the oscillating arm and the nozzle, as the nozzle emits the washing fluid thereon at a large distance relative to the windscreen, so that a relatively large amount of the washing fluid does not effectively reach a wiping pattern on the windscreen to be wiped. Further, it has become apparent that in the prior art a large amount of liquid (consumption) is required in an attempt to clean the windscreen to be wiped. Further, if the washing fluid is spread onto the car's body instead of onto the windscreen to be wiped, it may dirty the car. Indeed, ethanol, methanol and other components of the washing fluid are able to leave marks/spots on the car body and plastics, for example. By now mounting the nozzle onto the housing 17 a windscreen to be wiped can be effectively cleaned, without making parts of a car dirty, wherein less washing liquid is required to clean the windscreen to be wiped.

The invention is not restricted to the preferred embodiments shown in the figures, but extends also to other preferred variants within the scope of the appended claims.

The invention claimed is:

1. A windscreen wiper device, comprising:
an elastic, elongated carrier element, as well as an elongated wiper blade of a flexible material, which can be placed in abutment with a windscreen to be wiped, which wiper blade includes at least one longitudinal slit in which slit at least one longitudinal strip of the carrier element is disposed, which windscreen wiper device comprises a connecting device for a rod-shaped extension of an oscillating arm, wherein:
said rod-shaped extension can be pivotally connected to said connecting device about a pivot axis near a free end thereof, wherein said connecting device comprises a first part and a second part, wherein said rod-shaped extension of said oscillating arm can be pivotally connected to said first part about said pivot axis, with the interposition of said second part, wherein said first part is connected to said wiper blade and said second part is pivotally connected onto said first part, wherein said second part comprises a channel arranged to receive said free end of said rod-shaped extension;
said windscreen wiper device comprises a housing for said rod-shaped extension, wherein said housing is arranged to be connected to said second part, and wherein said housing comprises a channel to receive said rod-shaped extension, said channel of said housing in mounted position being co-axial with said channel of said second part; and
said second part comprises a resilient tongue arranged to engage into a hole of said housing, and wherein said resilient tongue is hingeable along a hinge axis between an inward position retaining said wiper blade onto said rod-shaped extension and an outward position releasing said wiper blade from said housing and said rod-shaped extension.

2. The windscreen wiper device according to claim 1, wherein said housing and said second part are arranged to be interconnected by sliding said housing onto said second part in longitudinal direction of said rod-shaped extension.

3. The windscreen wiper device according to claim 2, wherein said channel of said second part is arranged to receive said free end of said rod-shaped extension upon sliding said housing onto said second part.

4. The windscreen wiper device according to claim 2, wherein said second part is located inside said housing after sliding said housing onto said second part.

5. The windscreen wiper device according to claim 2, wherein said second part and said housing are configured to guide said housing onto said second part upon sliding said housing onto said second part.

6. The windscreen wiper device according to claim 1, wherein said channel of said second part and said channel of said housing each have a length and a width, and wherein a plane extending in a direction of the width of each channel and a plane extending through said longitudinal strip along a width thereof at the location of the connecting device enclose an angle a, wherein preferably $15° < a < 60°$.

7. The windscreen wiper device according to claim 1, wherein said resilient tongue is located near a free end of said second part facing away from said rod-shaped extension.

8. The windscreen wiper device according to claim 1, wherein said housing has an U-shaped cross-section at the location of its connection to said second part, and wherein a base of said U-shaped cross-section is provided with said hole.

9. The windscreen wiper device according to claim 1, wherein said hole has a closed circumference.

10. The windscreen wiper device claim 1, wherein said windscreen wiper device comprises first and second retention means for retaining said wiper blade onto said rod-shaped extension, wherein said first retention means comprises said resilient tongue on said second part and said hole in said housing, wherein said second retention means comprises at least one first stop surface provided on said first part and at least one second stop surface provided on said housing, both stop surfaces being spaced apart during normal operation of said windscreen wiper device, and wherein in case of malfunctioning of said first retention means, said first part is allowed to move with respect to said housing causing the first stop surface to correspondingly move towards the second stop surface until the first and second stop surfaces are adjacent one another to block in mounted position any movement of said wiper blade relative to said housing in a longitudinal direction away from said rod-shaped extension.

11. The windscreen wiper device according to claim 10, wherein said first part comprises a laterally outwardly extending protrusion comprising said first stop surface, wherein said housing comprises a downwardly extending protrusion comprising said second stop surface.

12. The windscreen wiper device according to claim 10, wherein, by pivoting said first part relative to said housing, said first and second stop surfaces are prevented from abutting one another, so that the wiper blade can be released from said rod-shaped extension.

13. The windscreen wiper device according to claim 1, wherein said channel of said second part and said channel of said housing in mounted position abut each other to block any movement of said wiper blade relative to said housing in a longitudinal direction towards said rod-shaped extension.

14. The windscreen wiper device according to claim 1, wherein said channel of said housing comprises a tab pivotal between a closed position arranged to snappingly engage into a recess provided on a longitudinal exterior side of said rod-like rod-shaped extension, and an open position arranged to disengage from said recess.

15. The windscreen wiper device according claim 1, wherein said first part and said second part are provided with mutually cooperating pivot means for pivotally connecting said second part to said first part.

16. The windscreen wiper device according to claim 15, wherein the pivot means further comprises: one or more protuberances of said first part; and recesses provided in said second part, wherein the one or more protuberances engage the recesses at the location of said pivot axis.

17. The windscreen wiper device according claim 1, wherein said second part is detachably connected to said first part through a snapping/clipping operation.

18. The windscreen wiper device according to claim 1, wherein a nozzle is mounted onto said housing.

\* \* \* \* \*